US009904451B2

(12) United States Patent
Moore et al.

(10) Patent No.: US 9,904,451 B2
(45) Date of Patent: Feb. 27, 2018

(54) INNOVATION MANAGEMENT (71) Applicant: SystemicLogic Innovation Agency (Pty) Ltd., Bryanston (ZA)

(72) Inventors: Rory Joseph Moore, Greenside (ZA); Jay Alec Van Zyl, Bryanston (ZA); Sean Patrick O'Reilly, Sandton (ZA)

(73) Assignee: SystemicLogic Innovation Agency (Pty) Ltd., Bryanston (ZA)

( * ) Notice: Subject to any disclaimer, the term of this patent is extended or adjusted under 35 U.S.C. 154(b) by 468 days.

(21) Appl. No.: 14/703,398

(22) Filed: May 4, 2015

(65) Prior Publication Data

US 2015/0234585 A1 Aug. 20, 2015

Related U.S. Application Data

(63) Continuation of application No. PCT/IB2013/059905, filed on Nov. 5, 2013.

(30) Foreign Application Priority Data

Nov. 5, 2012 (ZA) ................................ 2012/08251

(51) Int. Cl.
*G06F 3/0484* (2013.01)
*H04L 29/08* (2006.01)
*G06F 17/30* (2006.01)

(52) U.S. Cl.
CPC ...... *G06F 3/04847* (2013.01); *G06F 3/04842* (2013.01); *G06F 17/3053* (2013.01); *G06F 17/30958* (2013.01); *H04L 67/10* (2013.01)

(58) Field of Classification Search
CPC .................................................. G06F 3/04847

USPC .......................................................... 715/753
See application file for complete search history.

(56) References Cited

U.S. PATENT DOCUMENTS

| | | | | |
|---|---|---|---|---|
| 7,950,004 | B2 * | 5/2011 | Vieira ................. | G06F 11/3688 714/25 |
| 8,949,250 | B1 * | 2/2015 | Garg ................... | G06F 17/3053 707/748 |
| 2006/0271564 | A1 * | 11/2006 | Meng Muntz ......... | G06Q 10/00 |
| 2009/0055476 | A1 * | 2/2009 | Markus ................. | G06Q 10/00 709/204 |
| 2009/0265430 | A1 * | 10/2009 | Bechtel ............. | G06F 17/30994 709/205 |
| 2009/0271342 | A1 * | 10/2009 | Eder ................... | G06F 19/3437 706/20 |

(Continued)

OTHER PUBLICATIONS

Patent Cooperation Treaty International Search Report and the Written Opinion of the International Searching Authority for PCT/IB13/59905, Commissioner for Patents, Alexandria, VA, dated Jun. 6, 2014.

*Primary Examiner* — Reza Nabi
(74) *Attorney, Agent, or Firm* — M&B IP Analysts, LLC (57) ABSTRACT

An innovation management system, which includes a database of networked members, each of the networked members being associated with a pre-defined user profile, a user interface operable to receive inputs from a member and to display selected outputs to a member, a campaigns module onto which campaigns can be defined, a campaign being defined as a call to networked members to submit ideas for a particular context defined by the campaign, and an ideas module onto which ideas can be loaded, the ideas selectively being associated with a pre-defined campaign.

17 Claims, 5 Drawing Sheets

(56) References Cited

U.S. PATENT DOCUMENTS

| | | | |
|---|---|---|---|
| 2010/0094904 A1* | 4/2010 | Jandhyala | G06F 17/30864 707/791 |
| 2010/0313157 A1* | 12/2010 | Carlsson | G06F 17/30601 715/769 |
| 2011/0191372 A1* | 8/2011 | Kaushansky | G06F 17/30867 707/776 |
| 2012/0001919 A1* | 1/2012 | Lumer | G06F 17/30705 345/440 |
| 2012/0129145 A1* | 5/2012 | Miller | G09B 19/00 434/365 |
| 2012/0158633 A1* | 6/2012 | Eder | G06F 19/3437 706/46 |
| 2013/0282889 A1* | 10/2013 | Tito | H04L 43/00 709/224 |
| 2014/0011759 A1* | 1/2014 | Yaffe | A61K 31/517 514/34 |
| 2014/0194208 A1* | 7/2014 | Splaine | G06Q 50/01 463/42 |
| 2015/0019639 A1* | 1/2015 | Marlow | G06Q 50/01 709/204 |
| 2015/0113060 A1* | 4/2015 | Wahi | H04L 65/403 709/204 |
| 2015/0127650 A1* | 5/2015 | Carlsson | G06F 17/30011 707/737 |
| 2015/0234585 A1* | 8/2015 | Moore | G06F 3/04847 715/753 |
| 2016/0267397 A1* | 9/2016 | Carlsson | G06N 99/005 |
| 2017/0024651 A1* | 1/2017 | Mishra | G06N 5/04 |
| 2017/0220928 A1* | 8/2017 | Hajizadeh | G06N 3/08 |
| 2017/0242879 A1* | 8/2017 | Hatami-Hanza | G06F 17/30312 |

\* cited by examiner

INNOVATION MANAGEMENT

TECHNICAL FIELD

This disclosure relates to innovation management. In particular, the disclosure relates to an innovation management system, to a method of managing innovation and to a method of mapping networked members to ideas.

BACKGROUND

The inventors are aware of numerous innovation management systems, which are based on rigidly structured databases used to manage idea disclosures and to keep track of such disclosures, to rate such disclosures, and to aid decision making on such disclosures.

However, the known systems are all pre-programmed with rigid processes, ranking systems and approval mechanisms. Furthermore, in corporations or open innovations arrangements where tens of thousands of employees or networked members need to contribute to innovation, it is impossible to rigid, man operated systems to handle the volume of innovations effectively.

The inventors set out to develop a system that would be versatile enough to accommodate both rigid innovation management methods as well as open innovation management methods. In particular, the inventors set out to provide a system that can adapt as new requirements emerge, so as to address drawbacks of existing innovation management systems. Furthermore, one object of the invention is effectively to address the requirement to handle large volumes of innovations that can possibly be submitted by employees or networked members, which was not previously possible with known systems.

SUMMARY

According to one aspect of the disclosed embodiments, there is provided an innovation management system, which includes
- a database of networked members, each of the networked members being associated with a pre-defined user profile;
- a user interface operable to receive inputs from a member and to display selected outputs to a member;
- a campaigns module onto which campaigns can be defined, a campaign being defined as a call to networked members to submit ideas for a particular context defined by the campaign;
- an ideas module onto which ideas can be loaded, the ideas selectively being associated with a pre-defined campaign.

The innovation management system may include any one or more of:
- an implementation module operable to define a particular implementation framework,
- a social connections module operable to define associations between networked members,
- an organogram module containing a predefined hierarchy for at least some of the networked members.

The innovation management system may include a social tribe module, the social tribe module operable to define specialist associations between members. In particular, the members of the specialist association may be mobilised to take action on a particular idea within a campaign.

The innovation management system may additionally include a social network module, operable to define an interface with known proprietary social network services, such as Facebook, LinkedIn, Google+, and Twitter. The innovation management system may be operable to define a digital persona.

The digital persona may be operable to define any one or more of keywords, search terms, hashtags, and specific user profiles for retrieving information related to such keywords, search terms, hashtags, and specific user profiles from the social network services. In particular, the retrieved information may be defined as an idea.

The innovation management system may additionally include a social profile module, operable to define the member's profile.

The innovation management system may additionally include a social status module, operable to define a members social status.

The innovation management system may additionally include a system module, operable to define operation of the innovation management system.

The innovation management system may additionally include a user profile module, operable to define the user's profile.

The innovation management system may additionally include a liaison module, operable to facilitate liaison between members on particular ideas within pre-defined campaigns.

The innovation management system may additionally include a tags module, associated with the ideas module operable to display tag relevancy and usage.

The innovation management system may additionally include a dashboard module, operable to define a dashboard through which relevant data from the database can easily be assessed and displayed.

The innovation management system may additionally include an innovation forum module, operable to host discussions between members on innovation.

The innovation management system may additionally include a multi-site module, operable to define an interface to external databases.

The innovation management system may additionally include an ideas status module, operable to present status data of an idea to members.

The innovation management system may additionally include a news module, operable to push news items to members.

The innovation management system may additionally include a platform detection module, operable to detect the computer platform accessing the system.

The innovation management system may include at least three hosted interfaces including a desktop site, a mobile site, and a tablet site respectively, the hosted interfaces, upon detection of the accessing platform by the platform detection module, being operable to present the accessing platform with the respective hosted interface.

The innovation management system may include a social based innovation presentation module, referred to as a social network analysis module.

The social network analysis module may include
- member detail access means operable to access networked members' details from the database of networked members, such as their names or another unique member identifier;
- idea access means operable to access ideas, with reference to idea details such as idea titles or another unique idea identifier;
- association means operable to associate each of a networked member with any one or more of ideas associated with the networked member,
with other networked members associated with the member,
and to associate ideas with each other, the ideas being associated with a common networked member;
presentation means operable to group the networked members with each other and with ideas and operable to group ideas relative to each other in any one of a two- or multi-dimensional representation.

The presentation means may be operable to define a two dimensional plane, on which networked members and ideas are represented as markers and in which the association means are represented as vectors connecting networked members markers and ideas markers associated with the networked members.

The presentation means may include clustering means, operable to minimise the length of the vectors between the networked members markers and associated ideas markers, thereby graphically to cluster the networked members and associated ideas together.

The presentation means may be in the form of a multi-dimensional graph, which includes a ranking of associated ideas and networked members.

In the embodiment where the presentation means defines a multi-dimensional plane, two axes may define a two dimensional space on which the networked members markers and associated ideas markers are clustered together and in which the third axis represent a ranking of the ideas, by placing a higher ranked idea on a higher valued position on the axis and a lower ranked idea on a lower valued position on the axis.

The two dimensional graph may be updated in real time.
In particular, the two dimensional graph may be updated in real time with any one or more of:
association of ideas to networked members;
association of networked members amongst each other;
association of ideas amongst other ideas;
user profiles;
campaigns;
a predefined hierarchy of members;
specialist association between members;
keywords, search terms, hashtags and specific user profiles for retrieving information related to such keywords, search terms, hashtags and specific user profiles from the social network services;
a member's social status;
liaison between members on particular ideas within pre-defined campaigns;
tag relevancy and usage;
status data of an idea; and
news items.

The multi-dimensional graph may be updated in real time. In particular, the multi-dimensional graph may be updated in real time with a ranking of associated ideas and networked members.

The innovation management system may include an online sentiment analysis tool. The online sentiment analysis tool may be operable to identify keywords and themes within an idea and operable to generate a sentiment score of such idea based on the keywords and themes.

According to another aspect of the disclosed embodiments, there is provided a method of managing innovation, the method including
providing a database of networked members, each of the networked members being associated with a pre-defined user profile;
providing a user interface operable to receive inputs from a member and to display selected outputs to a member;
providing a campaigns module onto which campaigns can be defined, a campaign being defined as a call to networked members to submit ideas for a particular context defined by the campaign;
providing an ideas module onto which ideas can be loaded, the ideas selectively being associated with a pre-defined campaign.

The method may further include
providing any one or more of:
an implementation module operable to define a particular implementation framework,
a social connections module operable to define associations between networked members,
an organogram module containing a predefined hierarchy for at least some of the networked members.

35. A method as claimed in claim 33, which includes
providing a social tribe module, the social tribe module operable to define specialist associations between members.

The method may include
mobilising the members of the specialist association to take action on a particular idea within a campaign.

The method may include
providing a social network module, operable to define an interface with known proprietary social network services and operable to retrieve information on pre-defined ideas from the social network services.

The method may include defining a digital persona. The digital persona may be operable to define any one or more of keywords, search terms, hashtags and specific user profiles for retrieving information related to such keywords, search terms, hashtags and specific user profiles from the social network services.

The retrieved information may be defined as an idea.
The method may include providing a social profile module, operable to define the members profile.

The method may include providing a social status module, operable to define a member's social status.

The method may include providing a system module, operable to define operation of the innovation management system.

The method may include providing a user profile module, operable to define the users profile.

The method may include providing a liaison module, operable to facilitate liaison between members on particular ideas within pre-defined campaigns.

The method may include providing a tags module, associated with the ideas module operable to display tag relevancy and usage.

The method may include providing a dashboard module, operable to define a dashboard through which relevant data from the database can easily be assessed and displayed.

The method may include providing an innovation forum module, the method further including hosting discussions between members on innovation on the innovation forum module.

The method may include providing a multi-site module, operable to define an interface to external databases.

The method may include providing an ideas status module, the method further including presenting status data of an idea to members.

The method may include providing a news module, the method further including pushing news items to members.

The method may include providing a platform detection module, the method further including detecting the computer platform accessing the system.

The method may include providing at least three hosted interfaces including a desktop site, a mobile site and a tablet site respectively, the method further including detecting the accessing platform by means of the platform detection module and presenting the accessing platform with the respective hosted interface.

The method may include providing a social based innovation presentation module, referred to as a social network analysis module.

The method may further include providing:
member detail access means operable to access networked members' details from the database of networked members, such as their names or another unique member identifier;
idea access means operable to access ideas, with reference to idea details such as idea titles or another unique idea identifier;
association means operable to associate each of a networked member with any one or more of
  ideas associated with the networked member,
  with other networked members associated with the member,
  and to associate ideas with each other, the ideas being associated with a common networked member;
presentation means operable to group the networked members with each other and with ideas and operable to group ideas relative to each other in any one of a two- or multi-dimensional representation.

The method may include on the presentation means defining a two dimensional plane, on which networked members and ideas are represented as markers and in which the association means are represented as vectors connecting networked members markers and ideas markers associated with the networked members.

The method may include providing the presentation means with clustering means, the method further including minimising the length of the vectors between the networked members markers and associated ideas markers, thereby graphically to cluster the networked members and associated ideas together.

The method may include on the presentation means defining a multi-dimensional graph, which includes a representation of ranking of associated ideas and networked members.

The method may include clustering the networked members markers and associated ideas markers in a two dimensional space and representing a ranking of the ideas on a third axis by placing a higher ranked idea on a higher valued position on the axis and a lower ranked idea on a lower valued position on the axis.

The method may include updating the two dimensional graph in real time.

The method may include updating
the two dimensional graph in real time with any one or more of:
  association of ideas to networked members;
  association of networked members amongst each other;
  association of ideas amongst other ideas;
  user profiles;
  campaigns;
  a predefined hierarchy of members;
  specialist association between members;
  keywords, search terms, hashtags and specific user profiles for retrieving information related to such keywords, search terms, hashtags and specific user profiles from the social network services;
a member's social status;
  liaison between members on particular ideas within predefined campaigns;
  tag relevancy and usage;
status data of an idea; and
  news items.

The method may include updating the multi-dimensional graph in real time.

The method may include updating the multi-dimensional graph in real time with a ranking of associated ideas and networked members.

The method may include providing an online sentiment analysis tool.

The method may include identifying keywords and themes within an idea and generating a sentiment score of such idea based on the keywords and themes.

The disclosure extends to a method of mapping networked members to ideas, the method including
  plotting on a two dimensional plane markers indicative of networked members and associated ideas, the markers of members and ideas initially being distributed equally over the two dimensional plane;
  linking markers of members that are networked together with each other by drawing vectors between the markers;
  linking markers of ideas that are associated with members together with each other by drawing vectors between the markers of members and of associated ideas;
  minimising the length of the vectors by moving the markers of networked members and associated ideas on the two-dimensional plane so as to create a clustering of members and ideas around the most densely networked members and ideas.

The method may include plotting the markers of networked members and ideas on a multi-dimensional graph.

The disclosed embodiments will now be described by way of a non-limiting example only, with reference to the following drawing.

DETAILED DESCRIPTION

Figure 1:
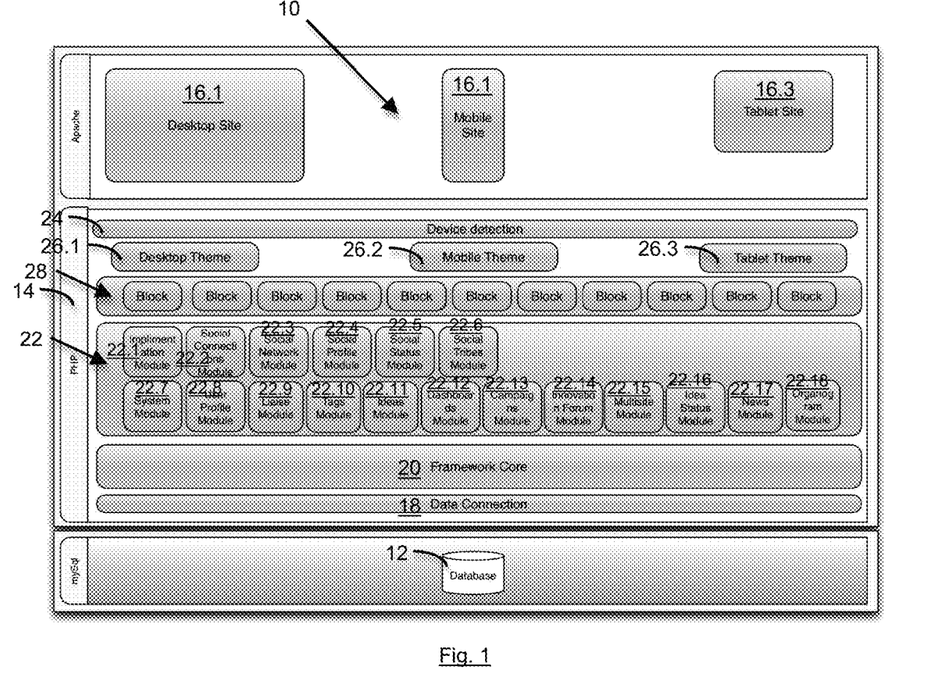
FIG. 1 shows a structure of a software implementation of an innovation management system in accordance with one embodiment.

In FIG. 1 a structure of a software implementation of an innovation management system 10 in accordance with one embodiment is shown.

The software structure comprises a database 12 being implemented on a "mysql" database platform in a remote location. The innovation management system 10 then includes a local implementation 14 residing at a users location.

The local implementation is in a PHP scripting language. Various forms of the local implementation may be provided such as a desktop site 16.1, a mobile site 16.2 and a tablet site 16.3.

At the base of the PHP implementation there is a data connection 18, which is linked to a framework core 20. The innovation management system is implemented by a number of modules 22. In particular, there is provided:

an implementation module 22.1
a social connections module 22.2
a social network module 22.3
a social profile module 22.4
a social status module 22.5
a social tribes module 22.6
a system module 22.7
a user profile module 22.8
a liaison module 22.9
a tags module 22.10
an ideas module 22.11
a dashboard module 22.12
a campaigns module 22.13
an innovation forum module 22.14
a multi-site module 22.15
an idea status module 22.16
a news module 22.17 and
an organogram module 22.18.

The innovation management system will typically include at least a database of networked members, each of the networked members being associated with a pre-defined user profile, a user interface operable to receive inputs from a member and to display selected outputs to a member, a campaigns module 22.13 onto which campaigns can be defined, a campaign being defined as a call to networked members to submit ideas for a particular context defined by the campaign, and an ideas module 22.11 onto which ideas can be loaded, the ideas selectively being associated with a pre-defined campaign.

Typical additions will include an implementation module 22.1 operable to define a particular implementation framework, a social connections module 22.2 operable to define associations between networked members and an organogram module 22.18 containing a predefined hierarchy for at least some of the networked members.

The innovation management system will also include a social tribe module 22.6, operable to define specialist associations between members. In particular, the members of the specialist association may be mobilised to take action on a particular idea within a campaign.

The innovation management system may additionally include a social network module 22.3, operable to define an interface with known proprietary social network services, such as Facebook, LinkedIn, Google+®, Twitter®. The innovation management can be used to define a digital persona. The digital persona is operable to define any one or more of keywords, search terms, hashtags, and specific user profiles for retrieving information related to such keywords, search terms, hashtags, and specific user profiles from the social network services. In particular, the retrieved information may be defined as an idea.

The various implementation modules are pre-programmed with functionality to permit operation of the innovation management system 10 to be adaptable as new requirements emerge.

The social profile module 22.4 is operable to define the member's profile, the social status module 22.5 is operable to define a member's social status, the system module 22.7 is operable to define operation of the innovation management system, the user profile module 22.8 is operable to define the users profile, the liaison module 22.9 is operable to facilitate liaison between members on particular ideas within pre-defined campaigns.

The tags module 22.10 is associated with the ideas module and is operable to display tag relevancy and usage, the dashboard module 22.12 is operable to define a dashboard through which relevant data from the database can easily be assessed and displayed.

In an embodiment, the framework core 20 may may be implemented in hardware, software, firmware or any combination thereof. In a preferred embodiment, the framework core 20 can be realized by a processing system. The processing system may comprise or be a component of a larger processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information. The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The innovation management system will typically also include an innovation forum module, operable to host discussions between members on innovation, a multi-site module 22.15, operable to define an interface to external databases, an ideas status module 22.16, operable to present status data of an idea to members, a news module 22.17, operable to push news items to members.

The innovation management system additionally includes a platform detection module, operable to detect the computer platform accessing the system. The local implementation 14 is provided with a platform detection module/device detection module 24 which is operable to detect the device accessing the implementation and then to present the device with any one of a desktop theme 26.1, a mobile theme 26.2, and a tablet theme 26.3, depending on the most appropriate implementation for the device which is accessing the local implementation 14.

The themes are implemented with a number of standardised blocks 28 on the display screens.

Figure 2:
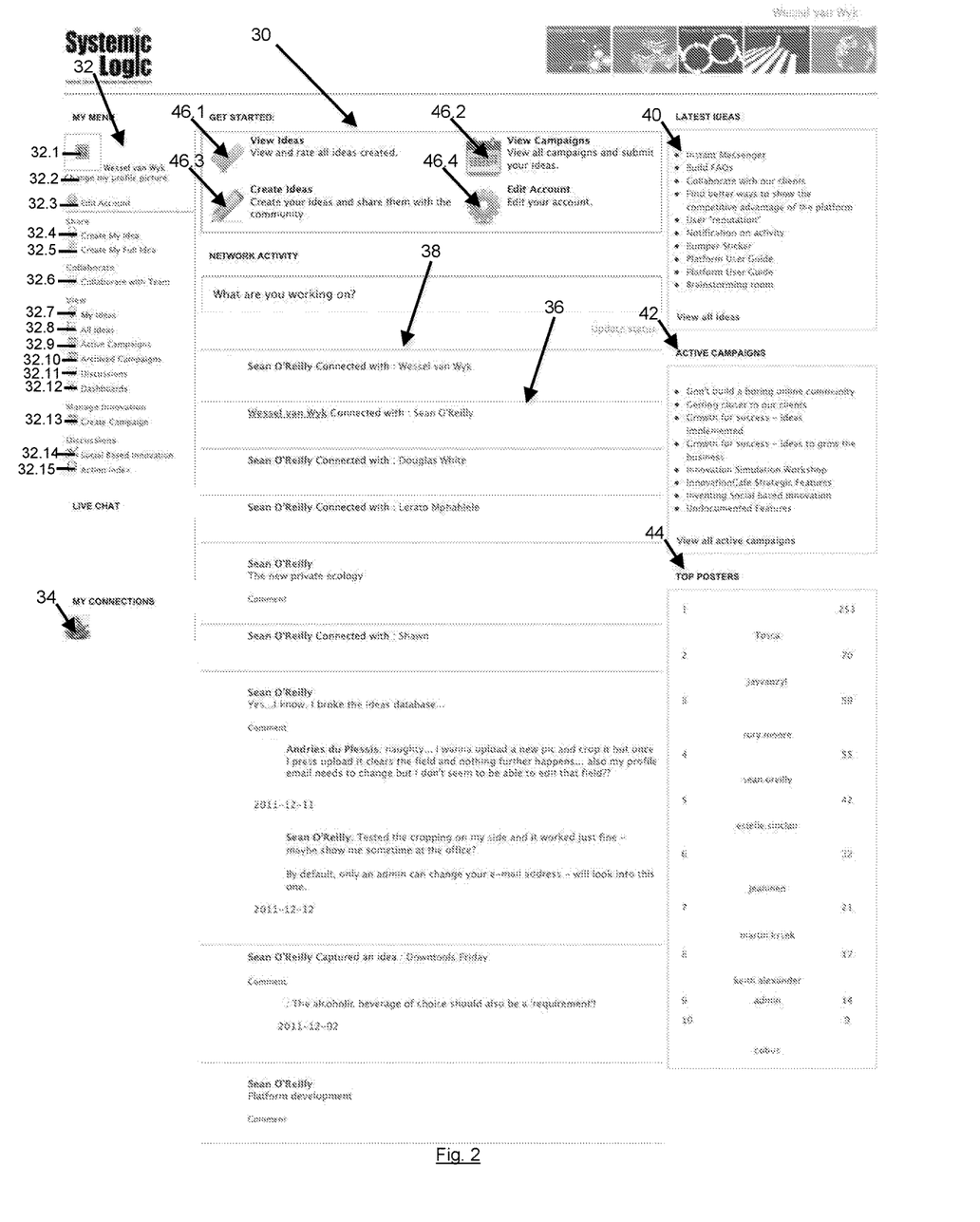
FIG. 2 shows a homepage of the software implementation of FIG. 1.

A homepage 30 of a desktop implementation of the innovation management system 10 is shown in FIG. 2.

In a left column/block 32 a user picture 32.1 is shown with an option to change the user picture 32.2 and an option to edit the user account 32.3. A button is provided to create an idea 32.4 and to create a more extensive idea 32.5.

A collaboration button 32.6 is provided to permit a user to collaborate with a particular pre-defined team.

A "My Ideas" button 32.7 is provided to display ideas associated with a user and an "All Ideas" button 32.8 to list all ideas in the innovation management system 10.

An "Active Campaigns" button 32.9 is provided to list all the active campaigns to which ideas can still be submitted and an "Archived Campaigns" button 32.10 button to list all archived campaigns, to which ideas cannot be submitted.

Figure 3:
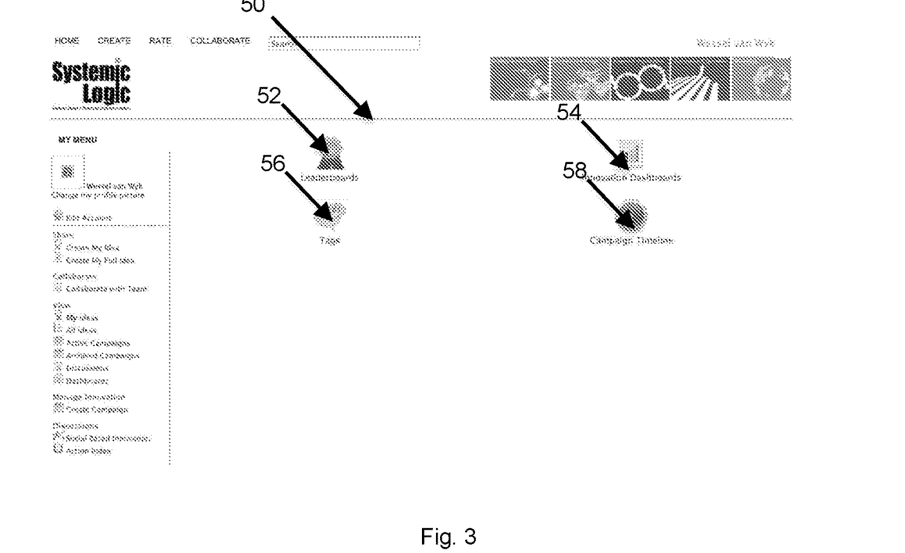
FIG. 3 shows a dashboard menu of the software implementation of FIG. 1.

A "Discussions" button 32.11 is provided to list all discussions on the various ideas and a "Dashboards" button 32.12 is provided to show the Dashboard screen 50 (see FIG. 3).

A "Create campaign" button 32.13 is provided for authorized members to create campaigns.

A "Social based innovation" button 32.14 is provided to access social network systems thereby to link the social network systems with ideas created in the innovation management system 10. An "Action index" permits a user to list all actions taking place in the innovation management system.

A networked member's connections are listed under the "My connections" block 34.

An activity stream is displayed in block 36 with an option to post an activity on the activity stream in the field 38.

On a right hand side of the screen 30 a block 40 list the "Latest ideas" and a block 42 list the "Active campaigns". The members posting the most comments are listed in the block "Top Posters" 44.

At the top of the screen a central block provides buttons to "View Ideas" 46.1, to "View Campaigns" 46.2, to "Create Ideas" 46.3, and to "Edit Account" 46.4.

In FIG. 3, the Dashboard screen 50, which is accessed via a "Dashboards" button 32.12.

Figure 4:
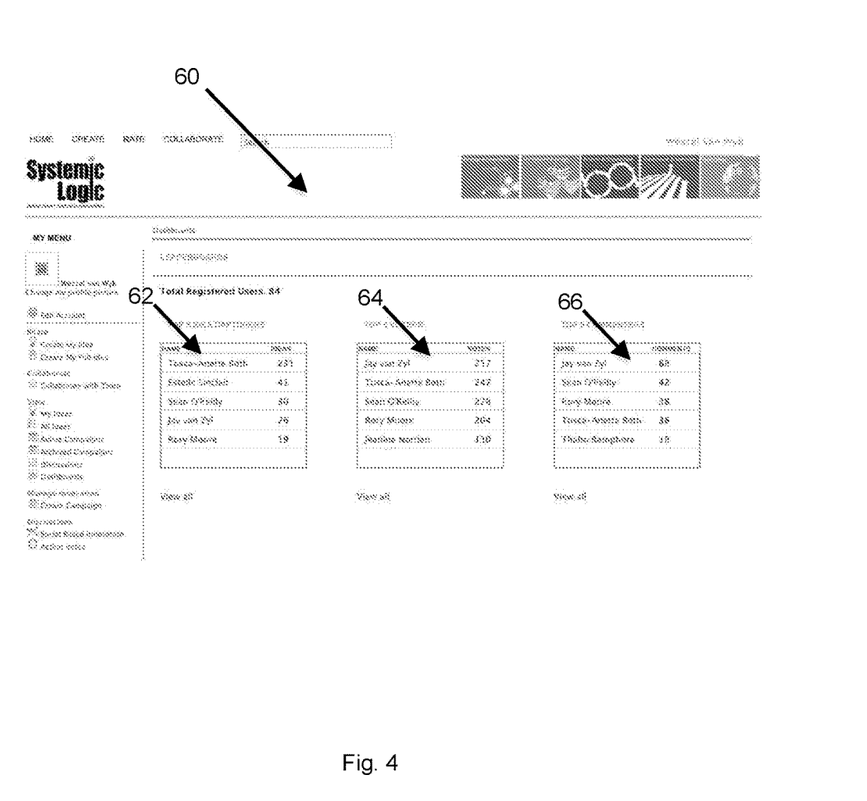
FIG. 4 shows a leader board ranking page of the software implementation of FIG. 1.

On the Dashboard screen 50 a "Leaderboards" button 52 provides access to the leaderboard screen 60 (see FIG. 4). An "Innovation Dashboards" button 54 provides access to the Innovation Dashboards screen 70 (see FIG. 5), a "Tags" button 56 provides access to a tags screen (not shown), and a "Campaign Timeline" 58 button to a Campaign timeline (see FIG. 6).

In FIG. 4, the leader board screen 60 displays the members submitting the most ideas in 62, the members that casted the most votes in 64, and the members that submitted the most comments in 66.

Figure 5:
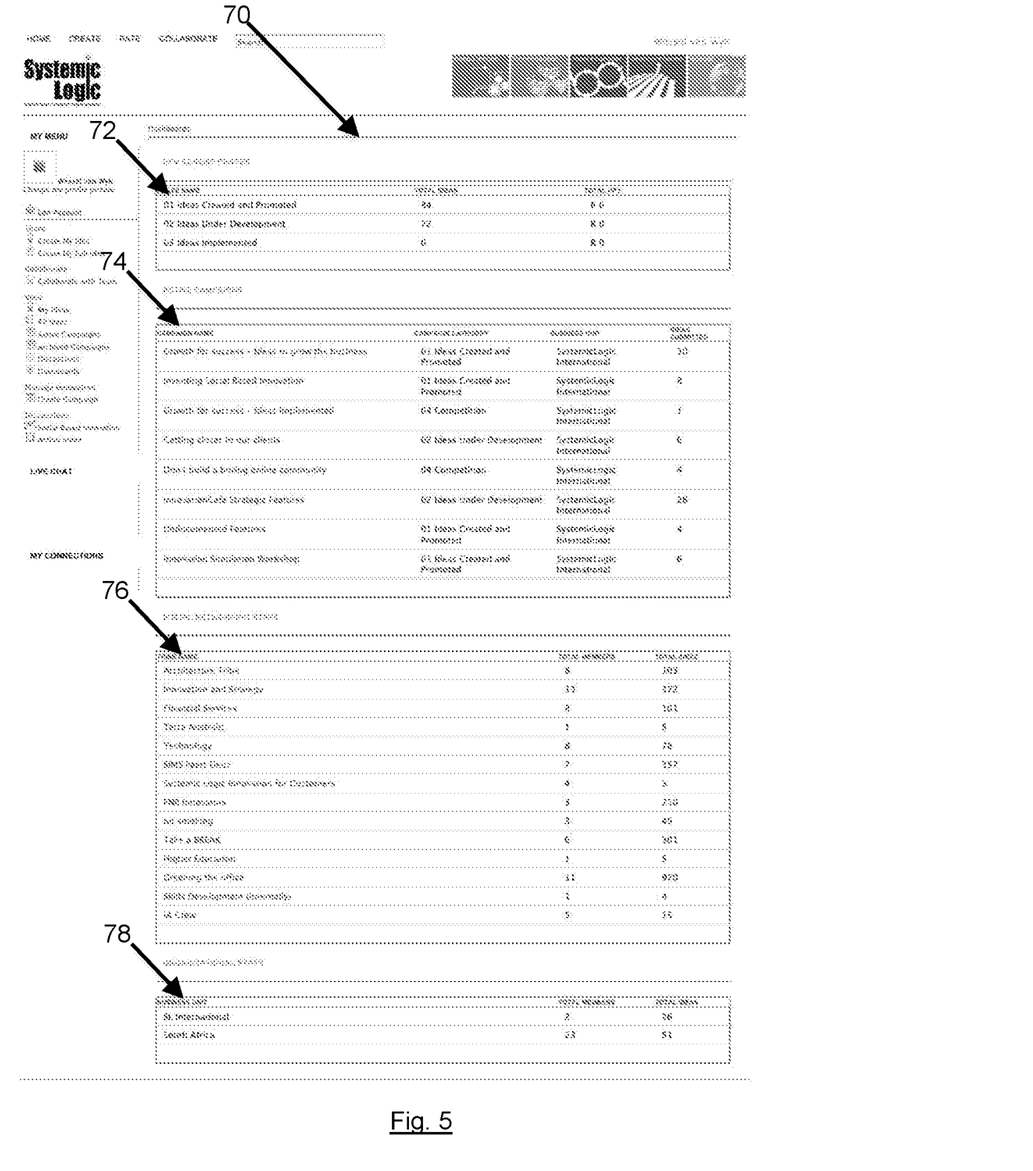
FIG. 5 shows an innovation dashboard page of the software implementation of FIG. 1.

In FIG. 5, the innovation dashboard screen 70 displays the phases through which ideas evolved in 72, a listing of active campaigns in 74, social network statistics in 76, and business units' statistics in terms of number of networked members and number of ideas in 78.

Figure 6:
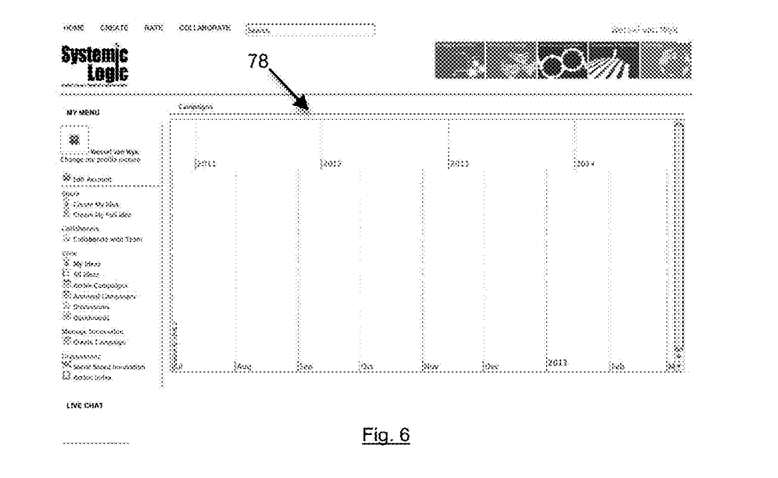
FIG. 6 shows a campaign timeline of the software implementation of FIG. 1.

In FIG. 6, a Campaign timeline 100 shows a Gant chart of all campaigns. The Gant chart can be zoomed in or out to display more or less detail.

Figure 7:
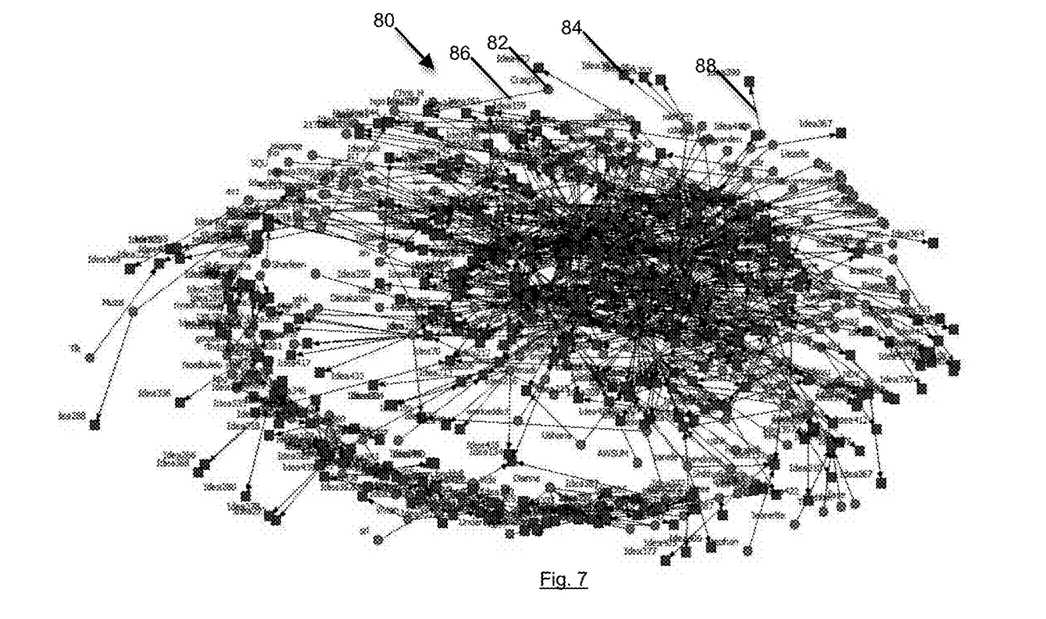
FIG. 7 shows a social based innovation diagram of the software implementation of FIG. 1.

The innovation management system includes a social based innovation presentation module, referred to as a social network analysis module. FIG. 7 shows a social based innovation diagram 80, also referred to as a social network analysis of the software implementation of the innovation management system of FIG. 1.

The social network analysis module includes member detail access means operable to access networked members' details from the database of networked members, such as their names or another unique member identifier, idea access means operable to access ideas, with reference to idea details such as idea titles or another unique idea identifier, association means operable to associate each of a networked member with any one or more of
  ideas associated with the networked member,
  with other networked members associated with the member,
  and to associate ideas with each other, the ideas being associated with a common networked member;

presentation means operable to group the networked members with each other and with ideas and operable to group ideas relative to each other in any one of a two- or multi-dimensional representation.

The presentation is operable to define a two dimensional plane, on which networked members and ideas are represented as markers and in which the association means are represented as vectors connecting networked members markers and ideas markers associated with the networked members.

The presentation means also includes clustering means, operable to minimise the length of the vectors between the networked members markers and associated ideas markers, thereby graphically to cluster the networked members and associated ideas together.

In another embodiment, the presentation means may be in the form of a multi-dimensional graph, which includes a ranking of associated ideas and networked members. In the embodiment where the presentation means defines a multi-dimensional plane, two axes may define a two dimensional space on which the networked members markers and associated ideas markers are clustered together and in which the third axis represent a ranking of the ideas, by placing a higher ranked idea on a higher valued position on the axis and a lower ranked idea on a lower valued position on the axis.

The social analysis diagram 80 (FIG. 7) is generated by plotting on a two dimensional plane the networked members 82 and their associated ideas 84, the members and ideas being distributed equally over the two dimensional plane. The networked members are linked together by drawing vectors 86 between the members and the ideas that are associated with networked members are linked by drawing vectors 88 between the members and the associated ideas. The length of the vectors are then minimised by moving the networked members and associated ideas on the two-dimensional plane so as to create a clustering of members and ideas around the most densely networked members and ideas.

Importantly, the two dimensional graph may be updated in real time. In particular, the two dimensional graph may be updated in real time with any one or more of:
  association of ideas to networked members;
  association of networked members amongst each other;
  association of ideas amongst other ideas;
  user profiles;
  campaigns;
  a predefined hierarchy of members;
  specialist association between members;
  keywords, search terms, hashtags, and specific user profiles for retrieving information related to such keywords, search terms, hashtags, and specific user profiles from the social network services;
  a member's social status;
  liaison between members on particular ideas within predefined campaigns;
  tag relevancy and usage;
  status data of an idea; and
  news items.

In another embodiment, the multi-dimensional graph may also be updated in real time. In particular, the multi-dimensional graph may be updated in real time with a ranking of associated ideas and networked members.

In another embodiment, the innovation management system may thus include an online sentiment analysis tool. The online sentiment analysis tool is operable to identify keywords and themes within an idea and operable to generate a sentiment score of such idea based on the keywords and themes.

From FIG. 7 it thus becomes apparent which members create a large amount of activity around them and which ideas are linked to the largest amount of activity. The clustering of networked members and associated ideas thus provides a graphical representation that can be used to analyse innovation activity.

The inventor is of the opinion that the disclosed embodiments as described and illustrated provides a novel innovation management system, a novel method of managing innovation, and a novel method of mapping networked members to ideas.

The invention claimed is:

1. An innovation management system, comprising:
a database of networked members, each of the networked members being associated with a pre-defined user profile;
a user interface operable to receive inputs from a member and to display selected outputs to a member;
a campaigns module onto which campaigns can be defined, the campaign being defined as a call to the networked members to submit ideas for a particular context defined by the campaign;
an ideas module onto which the ideas can be loaded, the ideas selectively being associated with a pre-defined campaign, wherein said system further comprising a social based innovation presentation module, referred to as a social network analysis module, the social network analysis module comprising:
member detail access means operable to access the networked members' details from the database of networked members;
idea access means operable to access ideas, with reference to idea details; association means operable to associate each of the networked members with at least one of:
ideas associated with the networked member, with other networked members associated with the member, and to associate the ideas with each other, the ideas being associated with a common networked member;
presentation means operable to group the networked members with each other and with the ideas and operable to group the ideas relative to each other in any one of a two- or multi-dimensional representation,
in which the presentation means is operable to define a two dimensional plane, on which the networked members and the ideas are represented as markers and in which the association means are represented as vectors connecting networked member markers and idea markers associated with the networked members in which the presentation means further comprises clustering means, operable to minimise the length of the vectors between the networked member markers and associated idea markers, thereby to graphically cluster the networked members and the associated ideas together,
in which the presentation means is in the form of a multi-dimensional graph, which comprises a ranking of the associated ideas and the networked members, further in which two axes define a two dimensional space on which the networked member markers and the associated idea markers are clustered together and in which a third axis represents a ranking of the ideas, by placing a higher ranked idea on a higher valued position on the axis and a lower ranked idea on a lower valued position on the axis.

2. The innovation management system as claimed in claim 1, further comprising at least one of:
an implementation module operable to define a particular implementation framework,
a social connections module operable to define associations between the networked members,
an organogram module containing a predefined hierarchy for at least one of the networked members,
a social tribe module, the social tribe module operable to define specialist associations between the members,
a social network module, operable to define an interface with known proprietary social network services,
a social profile module, operable to define the member's profile, a social status module, operable to define the member's social status, a system module, operable to define operation of the innovation management system,
a user profile module, operable to define a user's profile, a liaison module, operable to facilitate liaison between the members on particular ideas within the pre-defined campaigns,
a tags module, associated with the ideas module operable to display tag relevancy and usage,
a dashboard module, operable to define a dashboard through which relevant data from the database can easily be assessed and displayed,
an innovation forum module, operable to host discussions between the members on innovation,
a multi-site module, operable to define an interface to external databases,
an ideas status module, operable to present status data of an idea to the members,
a news module, operable to push news items to the members.

3. The innovation management system as claimed in claim 2, in which the social network module is operable to define a digital persona by means of at least one of:
keywords, search terms, hashtags, and specific user profiles for retrieving information related to such keywords, search terms, hashtags, and specific user profiles from the social network services.

4. The innovation management system as claimed in claim 1, further comprising a platform detection module, operable to detect a computer platform accessing the system.

5. The innovation management system as claimed in claim 4, further comprising at least three hosted interfaces including a desktop site, a mobile site, and a tablet site respectively, the hosted interfaces, upon detection of the accessing platform by the platform detection module, being operable to present the accessing platform with the respective hosted interface.

6. The innovation management system as claimed in claim 1, in which
the presentation means is updated in real time with at least one of: association of the ideas to the networked members; association of the networked members amongst each other; association of the ideas amongst other ideas; user profiles; campaigns;
a predefined hierarchy of the networked members; specialist association between the members;
keywords, search terms, hashtags, and specific user profiles for retrieving information related to such keywords, search terms, hashtags, and specific user profiles from the social network services; a social status of the member;
a liaison between the members on particular ideas within the pre-defined campaigns;

tag relevancy and usage; status data of the idea; and news items.

7. The innovation management system as claimed in claim 6, further comprising an online sentiment analysis tool operable to identify keywords and themes within the idea and operable to generate a sentiment score of the idea based on the keywords and themes.

8. A method of managing innovation, the method comprising:
providing a database of networked members, each of the networked members being associated with a pre-defined user profile;
providing a user interface operable to receive inputs from a member and to display selected outputs to the member;
providing a campaigns module onto which campaigns can be defined, the campaign being defined as a call to the networked members to submit ideas for a particular context defined by the campaign;
providing an ideas module onto which ideas can be loaded, the ideas selectively being associated with a pre-defined campaign, wherein said method further comprising:
providing a social based innovation presentation module, referred to as a 15 social network analysis module, the social network analysis module further providing at least one of:
member detail access means operable to access the networked members' details from the database of networked members:
idea access means operable to access ideas, with reference to idea details;
association means operable to associate each of the networked members with at least one of
ideas associated with the networked member, with other networked members associated with the member, and to associate the ideas with each other, the ideas being associated with a common networked member;
presentation means operable to group the networked members with each other and with the ideas and operable to group the ideas relative to each other in any one of a two- or multi-dimensional representation,
wherein the presentation means defining a two dimensional plane, on which the networked members and the ideas are represented as markers and in which the association means are represented as vectors connecting networked member markers and idea markers associated with the networked members,
wherein providing the presentation means with clustering means, the method further comprising minimising the length of the vectors between the networked member 5 markers and associated idea markers, thereby to graphically cluster the networked members and the associated ideas together,
wherein presentation means defining a multi-dimensional graph, which includes a representation of ranking of the associated ideas and the networked members, for clustering the networked member markers and the associated idea markers in a two dimensional space and representing a ranking of the ideas on a third axis by placing a higher ranked idea on a higher valued position on the axis and a lower ranked idea on a lower valued position on the axis.

9. The method as claimed in claim 8, further comprising: providing at least one of:
an implementation module operable to define a particular implementation framework,
a social connections module operable to define associations between the networked members,
an organogram module containing a predefined hierarchy for at least some of the networked members,
a social tribe module, the social tribe module operable to define specialist associations between the members and operable to take action on a particular idea within a campaign,
a social network module, operable to define an interface with known proprietary social network services and operable to retrieve information on predefined ideas from the social network services,
a social profile module, operable to define the member's profile, a social status module, operable to define the member's social status, a system module, operable to define operation of an innovation management system,
a user profile module, operable to define a user's profile,
a liaison module, operable to facilitate liaison between the members on particular ideas within the pre-defined campaigns,
a tags module, associated with the ideas module operable to display tag relevancy and usage,
a dashboard module, operable to define a dashboard through which relevant data from the database can easily be assessed and displayed,
an innovation forum module, the method further comprising hosting discussions between members on innovation on the innovation forum module,
a multi-site module, operable to define an interface to external databases,
an ideas status module, the method further comprising presenting status data of an idea to the members,
a news module, the method further including pushing news items to the members,
a platform detection module, the method further comprising detecting the computer platform accessing the system.

10. The method as claimed in claim 9, which includes defining a digital persona by means of at least one of keywords, search terms, hashtags, and specific user profiles for retrieving information related to such keywords, search terms, hashtags, and specific user profiles from the social network services.

11. The method as claimed in claim 10, further comprising: defining the retrieved information as the idea.

12. The method as claimed in claim 8, further comprising:
providing at least three hosted interfaces including a desktop site, a mobile site, and a tablet site respectively, the method further comprising detecting the accessing platform by means of the platform detection module and presenting the accessing platform with the respective hosted interface.

13. The method as claimed in claim 8, further comprising: updating the presentation means in real time with any one or more of:
association of the ideas to the networked members; association of the networked members amongst each other; association of the ideas amongst other ideas; user profiles; campaigns;
a predefined hierarchy of the members; specialist association between the members;
keywords, search terms, hashtags, and specific user profiles for retrieving information related to such keywords, search terms, hashtags, and specific user profiles from the social network services; a social status of the members;

a liaison between the members on particular ideas within the pre-defined campaigns;

tag relevancy and usage; status data of the idea; and news items.

14. The method as claimed in claim 13, further comprising: providing an online sentiment analysis tool operable to identify keywords and themes within the idea and generating a sentiment score of such idea based on the keywords and themes.

15. A non-transitory computer readable medium having stored thereon instructions for causing a processing system to execute the method according to claim 8.

16. A method of mapping networked members to ideas, the method comprising:

plotting on a two dimensional plane markers indicative of networked members and associated ideas, the markers of the networked members and the ideas initially being distributed equally over the two dimensional plane;

linking markers of the members that are networked together with each other by drawing vectors between the markers;

linking markers of the ideas that are associated with the networked members together with each other by drawing vectors between the markers of the networked members and of the associated ideas;

minimizing the length of the vectors by moving the markers of the networked members and the associated ideas on the two-dimensional plane so as to create a clustering of the networked members and the ideas around the most densely networked members and ideas, wherein the method further comprising plotting the markers of the networked members and ideas on a multi-dimensional graph which comprises a ranking of the associated ideas and the networked members, further in which two axes define a two dimensional space on which the networked member markers and the associated idea markers are clustered together and in which a third axis represents a ranking of the ideas, by placing a higher ranked idea on a higher valued position on the axis and a lower ranked idea on a lower valued position on the axis.

17. A non-transitory computer readable medium having stored thereon instructions for causing a processing system to execute the method according to claim 15.

\* \* \* \* \*